United States Patent
Crawley

(10) Patent No.: US 7,443,213 B2
(45) Date of Patent: Oct. 28, 2008

(54) STAGED LOCKING OF TWO PHASE LOCKED LOOPS

(75) Inventor: Casimir Johan Crawley, Hamilton, IN (US)

(73) Assignee: Thomson Licensing, Boulogne-Billancourt (FR)

(*) Notice: Subject to any disclaimer, the term of this patent is extended or adjusted under 35 U.S.C. 154(b) by 0 days.

(21) Appl. No.: 11/040,078

(22) Filed: Jan. 21, 2005

(65) Prior Publication Data

US 2006/0166627 A1 Jul. 27, 2006

(51) Int. Cl.
*H03L 7/06* (2006.01)

(52) U.S. Cl. .................. 327/156; 327/147; 327/162

(58) Field of Classification Search ............... 327/114, 327/147, 156, 162; 375/357; 348/500, 608
See application file for complete search history.

(56) References Cited

U.S. PATENT DOCUMENTS

| | | | |
|---|---|---|---|
| 4,125,815 A | | 11/1978 | Kirschner |
| 5,406,590 A | | 4/1995 | Miller et al. |
| 5,530,389 A | | 6/1996 | Rieder .................. 327/156 |
| 5,950,115 A | * | 9/1999 | Momtaz et al. ............. 455/73 |
| 6,192,093 B1 | * | 2/2001 | Lai et al. .................. 375/371 |
| 6,201,829 B1 | * | 3/2001 | Schneider .................. 375/221 |
| 6,215,835 B1 | * | 4/2001 | Kyles .................. 375/376 |
| 6,218,876 B1 | | 4/2001 | Sung et al. .................. 327/156 |
| 6,233,200 B1 | | 5/2001 | Knoll et al. |
| 6,335,766 B1 | * | 1/2002 | Twitchell et al. ............. 348/608 |
| 6,362,757 B1 | * | 3/2002 | Lee et al. .................. 341/102 |
| 6,404,818 B1 | * | 6/2002 | Obikane ............... 375/240.28 |
| 6,987,947 B2 | * | 1/2006 | Richenstein et al. ....... 455/3.06 |
| 7,151,814 B1 | * | 12/2006 | Kong et al. .................. 375/376 |
| 7,171,156 B2 | * | 1/2007 | Caffrey et al. ............. 455/3.06 |
| 2002/0030518 A1 | | 3/2002 | Dauth .................. 327/156 |

OTHER PUBLICATIONS

Search Report dated Jan. 9, 2004.

* cited by examiner

*Primary Examiner*—N. Drew Richards
*Assistant Examiner*—Hai L. Nguyen
(74) *Attorney, Agent, or Firm*—Joseph J. Laks; Robert D. Shedd; Brian J. Cromarty

(57) ABSTRACT

Data synchronization is achieved in devices which transmit and/or receive audio and/or video data through the staged locking of phase locked loops. According to an exemplary embodiment, a transmitter includes a serial data source. An encoder provides encoded data and includes a first PLL. A controller includes a second PLL which enables generation of a clock signal. The controller is coupled between the serial data source and the encoder for providing the clock signal to the encoder. The first PLL of the encoder locks to the clock signal.

10 Claims, 4 Drawing Sheets

STAGED LOCKING OF TWO PHASE LOCKED LOOPS

The present invention generally relates to data synchronization, and more particularly, to a technique for achieving data synchronization in devices such as a wireless audio transmitter through the staged locking of phase locked loops (PLLs).

Data synchronization is essential to the proper operation of certain electronic devices, such as devices which transmit and/or receive audio and/or video signals. With devices which transmit audio signals, for example, a lack of data synchronization may cause audio discontinuities during reproduction which adversely affects a user's listening experience. Similarly, with devices which transmit video signals, a lack of data synchronization may cause video discontinuities during reproduction which adversely affects a user's viewing experience.

Data synchronization problems in such devices may be attributable to various factors. For example, with certain devices a data rate mismatch between the rate at which a device receives data and the rate at which the device transmits data may create data synchronization problems. Such data rate mismatches may for example be evident when certain data registers of the device fail to stably maintain a prescribed data fill state. When such data rate mismatches occur, the aforementioned data discontinuities may also intermittently occur and thereby adversely affect a user's listening and/or viewing experience.

Accordingly, there is a need for a device and method which avoids the problems described above and thereby provides data synchronization in devices which transmit and/or receive audio and/or video signals. The present invention addresses these and other issues.

In accordance with an aspect of the present invention, a device providing staged locking of PLLs is disclosed. According to an exemplary embodiment, the device comprises a serial data source. Encoding means provides encoded data and includes a first PLL. Control means including a second PLL enables generation of a clock signal. The control means is coupled between the serial data source and the encoding means for providing the clock signal to the encoding means. The first PLL of the encoding means locks to the clock signal.

In accordance with another aspect of the present invention, a method for providing data synchronization is disclosed. According to an exemplary embodiment, the method comprises steps of receiving serial data, generating a clock signal responsive to the serial data using a first PLL, and generating a frequency responsive to the clock signal using a second PLL.

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

Figure 1:
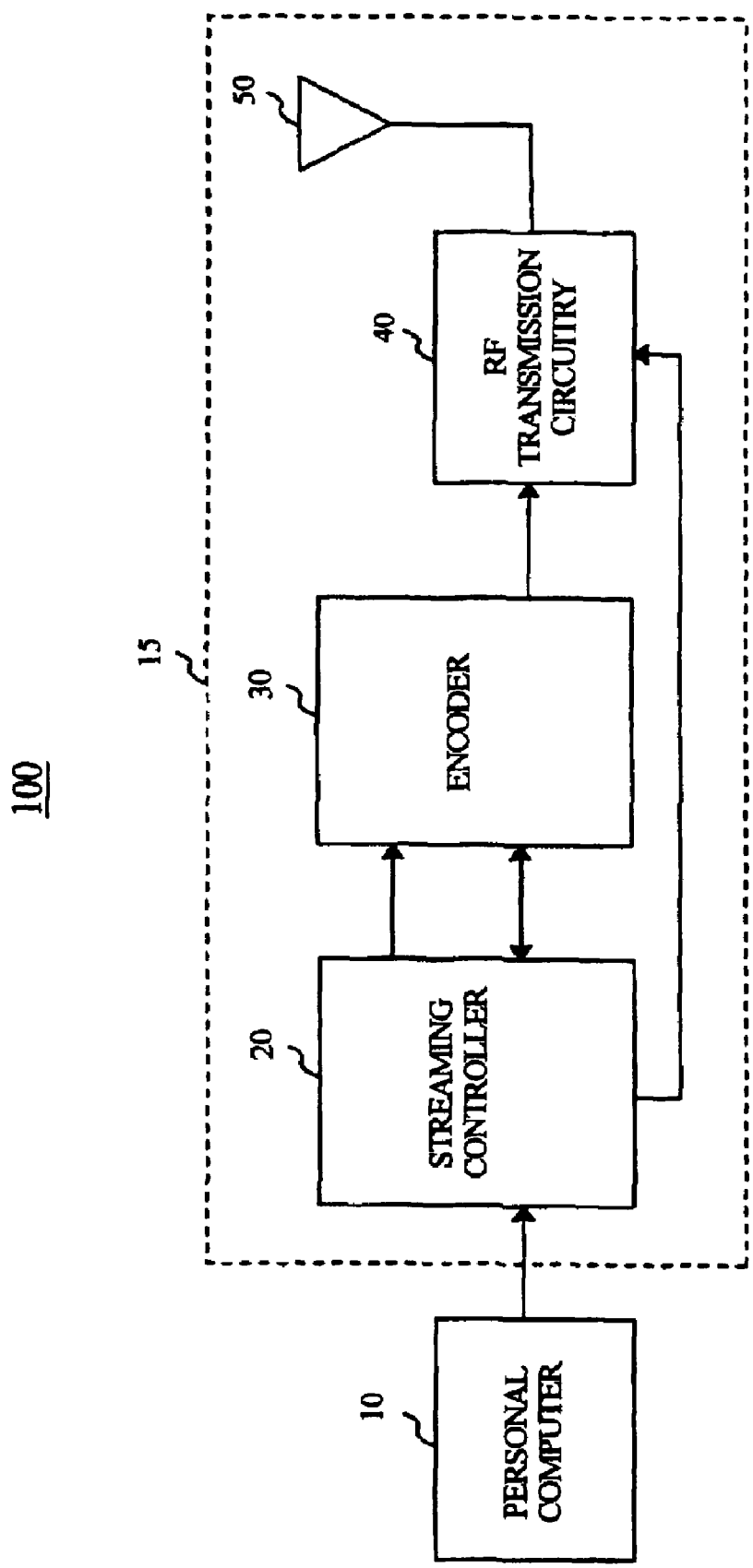
FIG. 1 is a block diagram of an exemplary environment suitable for implementing the present invention.

Referring now to the drawings, and more particularly to FIG. 1, a block diagram of an exemplary environment 100 suitable for implementing the present invention is shown. In FIG. 1, environment 100 comprises computing means such as personal computer (PC) 10 and transmission means such as wireless transmitter 15. Wireless transmitter 15 comprises control means such as streaming controller 20, encoding means such as encoder 30, radio frequency (RF) transmission means such as RF transmission circuitry 40, and signal output means such as antenna 50. For purposes of example and explanation, environment 100 includes elements which enable wireless transmission of audio signals. However, it will be intuitive to those skilled in the art that the principles of the present invention may also be applied to other devices, such as, but not limited to, devices which transmit video signals and devices which receive audio and/or video signals.

In FIG. 1, PC 10 is operative to perform various computing operations, and may for example be embodied as a commercially available desktop, laptop or other type of computer. According to an exemplary embodiment, PC 10 serially outputs digital audio signals to wireless transmitter 15 via a bus such as a universal serial bus (USB). Wireless transmitter 15 is operative to encode the digital audio signals provided from PC 10, and wirelessly transmit encoded audio signals to a receiving device (not shown), such as a Lyra audio player manufactured by Thomson. As will be discussed later herein, wireless transmitter 15 performs a data synchronization process through the staged locking of PLLs, and thereby avoids audio discontinuities that negatively impact a user's listening experience.

Figure 2:
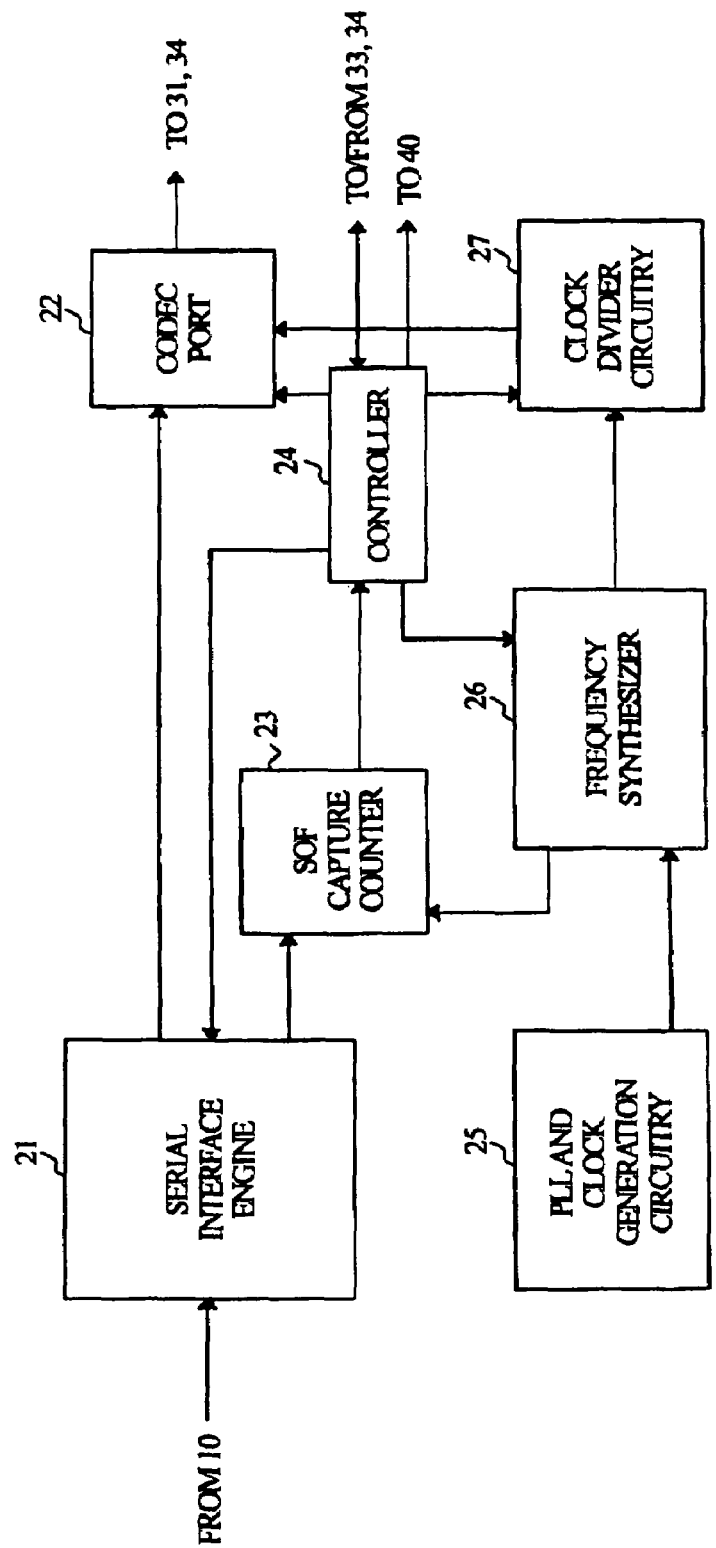
FIG. 2 is a block diagram illustrating further details of the controller of FIG. 1 according to an exemplary embodiment of the present invention.

Referring to FIG. 2, a block diagram illustrating further details of streaming controller 20 of FIG. 1 according to an exemplary embodiment of the present invention is shown. In particular, FIG. 2 shows elements of streaming controller 20 which provide its clock management function. As shown in FIG. 2, streaming controller 20 comprises a serial interface engine 21, a codec port 22, a start of frame (SOF) capture counter 23, a controller 24, a PLL and clock generation circuitry 25, a frequency synthesizer 26, and clock divider circuitry 27. Streaming controller 20 may for example be embodied as an integrated circuit (IC) such as a Texas Instruments TAS 1020.

In FIG. 2, serial interface engine 21 is operative to receive data such as audio data from PC 10 and serially stream the received audio data to codec port 22. In this process, the incoming data rate to serial interface engine 21 and the outgoing data rate from codec port 22 must be synchronized in order to avoid audio discontinuities which negatively affect a user's listening experience. According to an exemplary embodiment, serial interface engine 21 receives a SOF signal from PC 10 every 1 millisecond indicating the start of a USB frame. These received USB frames contain audio data that conforms to the compact-disk (CD) audio standard having a 44.1 kHz sample rate, a 16-bit sample size, and 2 samples per audio data frame. With this exemplary embodiment, data synchronization is achieved by providing codec port 22 with a 1.4112 (i.e., 44.1 k*16*2) MHz clock signal.

In order to generate the aforementioned 1.4112 MHz clock signal, PLL and clock generation circuitry 25 provide a 48 MHz reference frequency which enables frequency synthesizer 26 to generate a clock signal which is nominally 22.5792 MHz. Clock divider circuitry 27 receives the 22.5792 MHz clock signal from frequency synthesizer 26 and is operative to divide the 22.5792 MHz clock signal by 16 to thereby generate the 1.4112 MHz clock signal which is provided to codec port 22. Codec port 22 uses the 1.4112 MHz clock signal to generate a 44.1 kHz word clock (WCLK) signal, and a 1.4112 MHz bit clock (BCLK) signal.

Frequency synthesizer 26 also provides the aforementioned 22.5792 MHz clock signal to SOF capture counter 23 which counts the number of 22.5792 MHz clock events per USB frame and interrupts controller 24 with a corresponding count value every 1 millisecond based on the aforementioned SOF signal provided from PC 10 via serial interface engine 21. Controller 24 is operative to create a software-based PLL that uses the count values from SOF capture counter 23 to generate a control signal which controls frequency synthesizer 26 in order to arrive at an average number of 22.5792 MHz clock events per USB frame.

Figure 3:
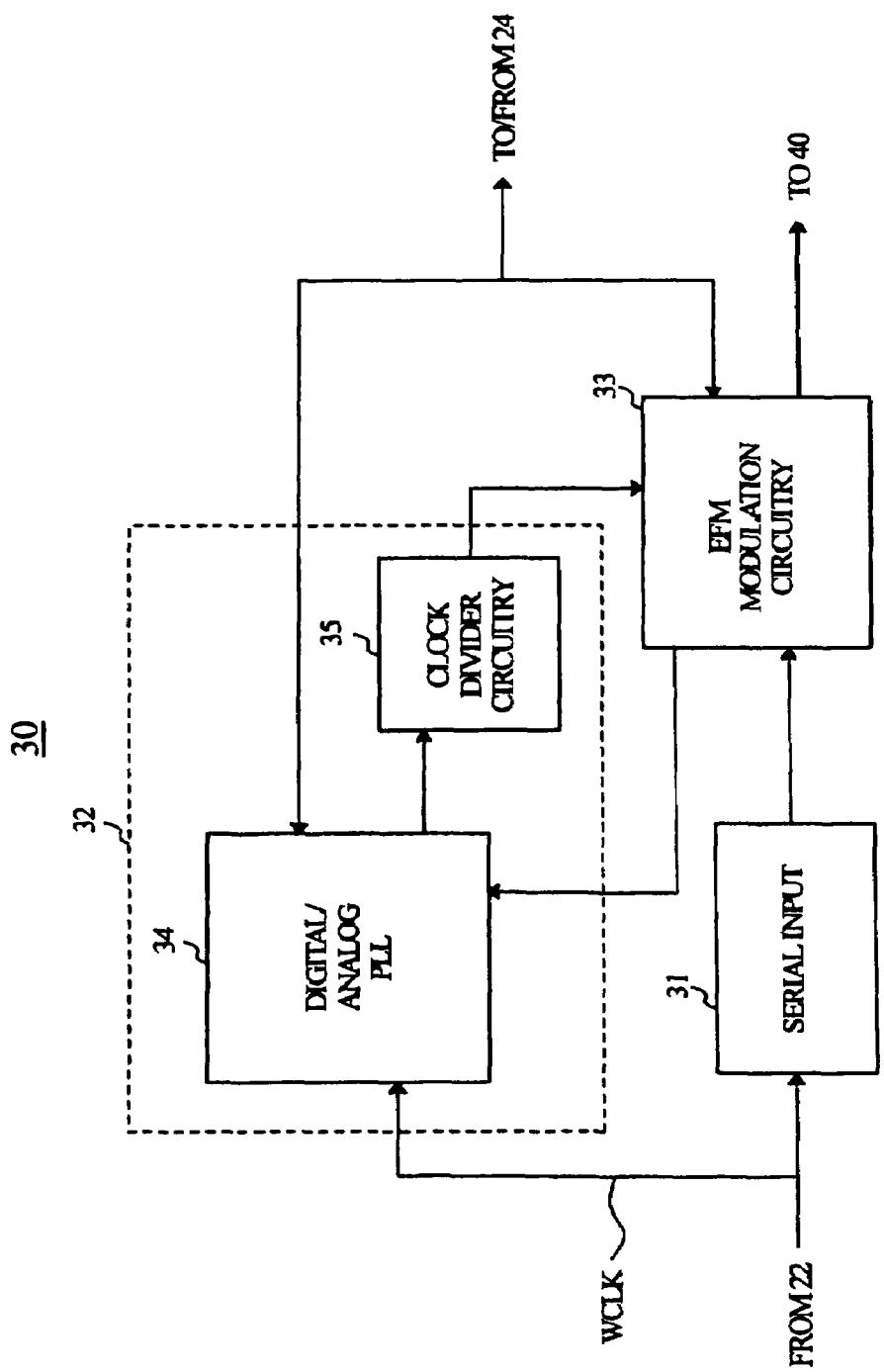
FIG. 3 is a block diagram illustrating further details of the encoder of FIG. 1 according to an exemplary embodiment of the present invention.

Referring to FIG. 3, a block diagram illustrating further details of encoder 30 of FIG. 1 according to an exemplary embodiment of the present invention is shown. In particular, FIG. 3 shows elements of encoder 30 which provide its clock management function. As shown in FIG. 3, encoder 30 comprises a serial input 31, an eight-to-fourteen bit modulation (EFM) clock generator 32, and EFM modulation circuitry 33. EFM clock generator 32 comprises a digital/analog PLL 34, and clock divider circuitry 35. Encoder 30 may for example be embodied as an IC such as a Philips SAA7392.

In FIG. 3, serial input 31 is operative to receive the aforementioned WCLK signal, BCLK signal, and audio data from codec port 22 of streaming controller 20 of FIG. 2. According to an exemplary embodiment, the WCLK signal, BCLK signal, and audio data are provided from codec port 22 to serial input 31 via a bus such as an inter-IC sound (I2S) bus which connects streaming controller 20 and encoder 30. Serial input 31 streams the WCLK signal, BCLK signal, and audio data to EFM modulation circuitry 33 which includes a first-in, first-out (FIFO) register operating at 4.3218 MHz.

Serial input 31 also provides the WCLK signal to EFM clock generation circuitry 32 which synchronizes to the incoming data rate by using the 44.1 kHz WCLK signal as the reference frequency for digital/analog PLL 34 and a FIFO fill state signal from EFM modulation circuitry 33 as an error signal for digital/analog PLL 34. According to an exemplary embodiment, digital/analog PLL 34 provides a 69.1488 MHz clock signal to clock divider circuitry 35 which is operative to divide the 69.1488 MHz clock signal by 16 to thereby generate the 4.3218 MHz clock signal which is provided to the FIFO register of EFM modulation circuitry 33.

According to an exemplary embodiment, digital/analog PLL 34 is locked to the 44.1 kHz reference frequency of the WCLK signal when its analog PLL input frequency is between 100 and 140 MHz. With this exemplary embodiment, when the digital/analog PLL is locked, the FIFO fill state signal from EFM modulation circuitry 33 should stably indicate a fill state between 5856 and 6120 bytes. Once the analog PLL input frequency of digital/analog PLL 34 is between 100 and 140 MHz, and the FIFO fill state of EFM modulation circuitry 33 is between 5856 and 6120 bytes, streaming controller 20 of FIG. 2 can stream audio data without audio discontinuities. According to an exemplary embodiment, controller 24 of streaming controller 20 detects when the analog PLL input frequency of digital/analog PLL 34 and the FIFO fill state of EFM modulation circuitry 33 are within the prescribed ranges indicated above by reading these frequency and fill state values via a bi-directional bus such as an inter-IC (I2C) bus which connects streaming controller 20 and encoder 30.

When the aforementioned frequency and fill state conditions of encoder 30 are detected, controller 24 of streaming controller 20 enables audio data to be streamed from PC 10 to encoder 30 for EFM encoding. EFM modulation circuitry 33 of encoder 30 then provides EFM encoded data to RF transmission circuitry 40 for wireless transmission via antenna 50 to a receiving device (not shown), such as a Lyra audio player manufactured by Thomson Inc.

Figure 4:
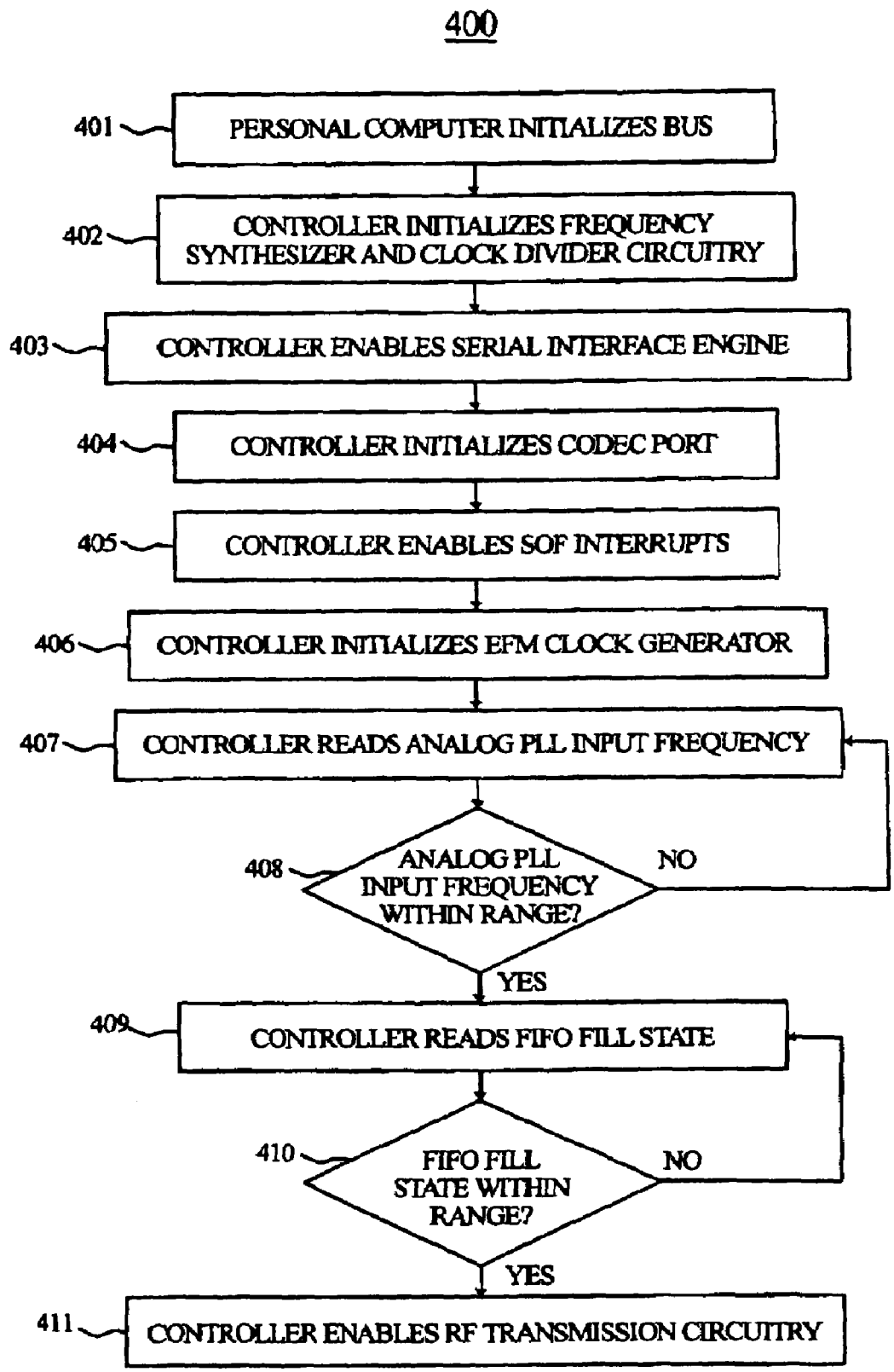
FIG. 4 is a flowchart illustrating steps according to an exemplary embodiment of the present invention.

To facilitate a better understanding of the inventive concepts of the present invention, a more concrete example will now be provided. Referring to FIG. 4, a flowchart 400 illustrating steps according to an exemplary embodiment of the present invention is shown. For purposes of example and explanation, the steps of FIG. 4 will be described with reference to PC 10, streaming controller 20, and encoder 30 of FIGS. 1 to 3. The steps of FIG. 4 are merely exemplary, and are not intended to limit the present invention in any manner.

At step 401, PC 10 initializes the bus connecting it to wireless transmitter 15. As previously indicated herein, this bus may for example represent a USB which is generally known in the art. At step 402, controller 24 of streaming controller 20 initializes frequency synthesizer 26 and clock divider circuitry 27 by providing initialization signals thereto. At step 403, controller 24 enables serial interface engine 21 by providing an enabling signal thereto. At step 404, controller 24 initializes codec port 22 by providing an initialization signal thereto.

At step 405, controller 24 enables SOF interrupts by configuring itself to be interrupted by SOF capture counter 23. As previously indicated herein, SOF capture counter 23 counts the number of 22.5792 MHz clock events per USB frame and interrupts controller 24 with a corresponding count value every 1 millisecond based on the aforementioned SOF signal provided from PC 10 via serial interface engine 21. At step 406, controller 24 initializes EFM clock generator 32 of encoder 30 by providing an initialization signal to digital/analog PLL 34 via the I2C bus which connects streaming controller 20 and encoder 30.

At step 407, controller 24 reads the analog PLL input frequency from digital/analog PLL 34 via the I2C bus. At step 408, controller 24 then determines whether the analog PLL input frequency read at step 407 is within its prescribed range. As previously indicated herein, the analog PLL input frequency of digital/analog PLL 34 is within its prescribed range according to an exemplary embodiment of the present invention when it is between 100 and 140 MHz. When the determination at step 408 is negative, process flow loops back to step 407 where controller 24 again reads the analog PLL input frequency from digital/analog PLL 34 via the I2C bus. In this manner, steps 407 and 408 are repeated until controller 24 determines that the analog PLL input frequency of digital/analog PLL 34 is within its prescribed range. Once the analog PLL input frequency is within its prescribed range, process flow advances to step 409.

At step 409, controller 24 reads the FIFO fill state from EFM modulation circuitry 33 via the I2C bus. At step 410, controller 24 then determines whether the FIFO fill state read at step 409 is within its prescribed range. As previously indicated herein, the FIFO fill state of EFM modulation circuitry 33 is within its prescribed range according to an exemplary embodiment of the present invention when it is between 5856 and 6120 bytes. When the determination at step 410 is negative, process flow loops back to step 409 where controller 24 again reads the FIFO fill state from EFM modulation circuitry 33 via the I2C bus. In this manner, steps 409 and 410 are repeated until controller 24 determines that the FIFO fill state of EFM modulation circuitry 33 is within its prescribed range.

Once the FIFO fill state is within its prescribed range, process flow advances to step 411 where controller 24 enables RF transmission circuitry 40 by providing an enabling signal thereto.

After steps 401 to 411 of FIG. 4 are performed, data such as audio data may be synchronously streamed without discontinuities from PC 10 to wireless transmitter 15 for encoding and wireless transmission to a receiving device (not shown), such as a Lyra audio player manufactured by Thomson. In FIG. 4, it is noted that controller 24 of streaming controller 20 enables SOF interrupts at step 405 after it initializes codec port 22 at step 404, and before it initializes EFM clock generator 32 at step 406. This exemplary methodology enables PLL locking to occur in stages. In particular, the BCLK and WCLK signals are first synchronized to the SOF signal from PC 10 with the software PLL of controller 24 of streaming controller 20. Next, digital/analog PLL 34 of encoder 30 is locked to the incoming WCLK signal. In this manner, since EFM modulation circuitry 33 is clocked by the 4.3218 MHz clock signal from digital/analog PLL 34, the incoming data rate from PC 10 to streaming controller 20 and the outgoing EFM encoded data rate from encoder 30 are synchronized and the FIFO fill state of EFM modulation circuitry 33 is stabilized.

Table 1 below provides "C" source code which may be used to implement the steps of FIG. 4. In particular, this code may be executed on controller 24 of streaming controller 20.

TABLE 1

```
**************************************************************
/* Initialize USB Serial Interface Engine and Codec Port */
devRomFunction(ROM_ENG_USB_INIT);
/* wait for Codec Port initialization */
while (CodecInited == 0);
/* enable USB SOF interrupts */
USBIMSK I= 0X10;
/* wait for ACG update */
delay((SOFTPLL_UPDATE_PERIOD + 1) * 4);
/* loop until SAA7392 encoder initializes */
while (0>= (error_code = Startup_Encoder( )))
{
    /* Error */
    Panic(error_code);
    /* reset the SAA7392 encoder */
    ColdResetCodec( );
}
/* initialize I/O */
rf_ctrl_gpio_init( );
/* read valid rotary dial */
InitAppTimer(ROTARY_SWITCH_TIMER, 0);
rotsw = P1 & 0x70;
while (!ReadRotarySwitch(rotsw)) rotsw = P1 & 0x70;
/* hop to the desired channel frequency */
rf_ctrl_synthesizer(rotsw);
**************************************************************
```

As described herein, the present invention provides a technique for achieving data synchronization in devices such as a wireless audio transmitter through the staged locking of PLLs. While an exemplary embodiment of the present invention has been described herein with reference to a wireless audio transmitter, the principles of the present invention may also be used to provide data synchronization in other devices such as, but not limited to, devices which transmit video signals and devices which receive audio and/or video signals.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A device, comprising:
   means for receiving data from a serial data source;
   encoding means for encoding said data, said encoding means including a first phase locked loop wherein said first phase locked loop is adapted to lock to a clock signal for synchronizing said data;
   control means including a second phase lock loop generating a reference signal responsive to said data for use in generating said clock signal, said control means coupled between said serial data source and said encoding means for providing said clock signal to said encoding means and determining whether said first phased locked loop is locked; and
   transmission means for transmitting said data from the serial data source in response to said control means determining said first phased lock loop is locked.

2. The device of claim 1, further comprising means for enabling wireless transmission of said encoded data.

3. The device of claim 1, wherein said encoded data includes audio data.

4. The device of claim 1, wherein said encoded data includes video data.

5. The device of claim 1, wherein said device is a transmitter.

6. A method for providing data synchronization, comprising:
   receiving serial data;
   generating a first clock signal responsive to said serial data;
   generating a second clock signal in response a comparison comprising said first clock signal; and
   enabling transmission of said serial data upon determination that said second clock signal is substantially synchronized with said first clock signal.

7. The method of claim 6, further comprising the steps of:
   generating encoded data responsive to said generated frequency; and
   enabling wireless transmission of said encoded data.

8. The method of claim 7, wherein said encoded data includes audio data.

9. The method of claim 7, wherein said encoded data includes video data.

10. The method of claim 6, wherein said clock signal is generated responsive to a start of frame signal included in said serial data.

* * * * *